Oct. 13, 1942.   D. L. CHANDLER ET AL   2,298,527
REVERSING MECHANISM
Original Filed June 22, 1940    3 Sheets-Sheet 1
Fig. 1.
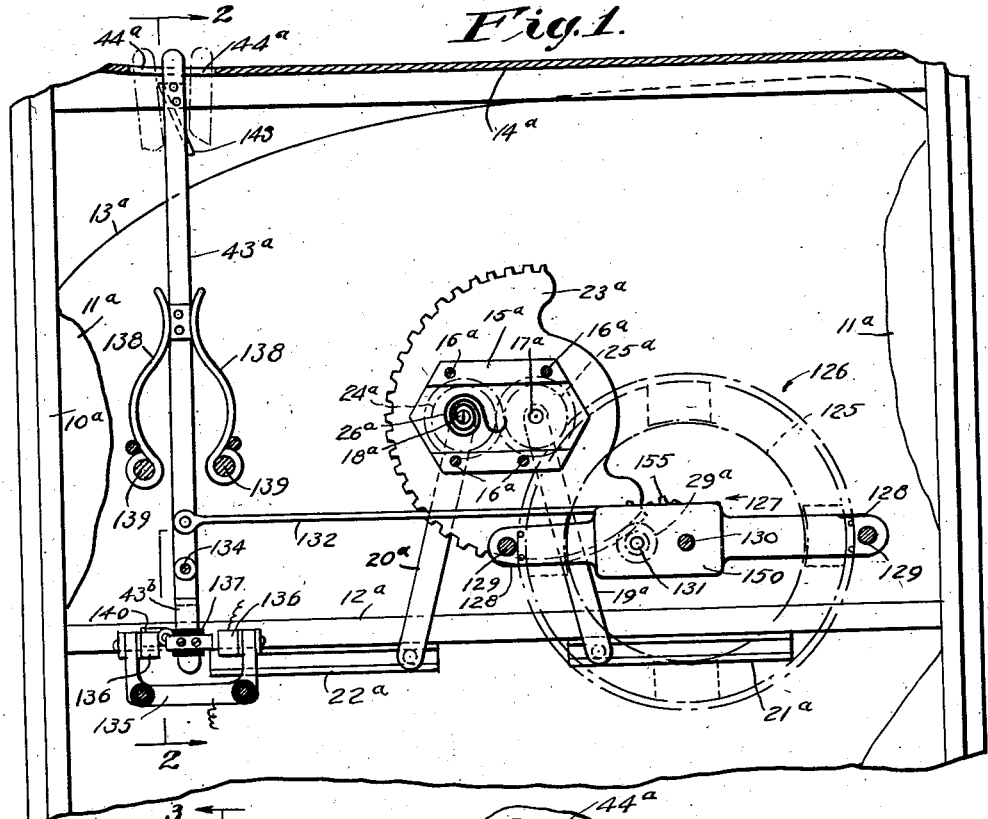
Fig. 2.
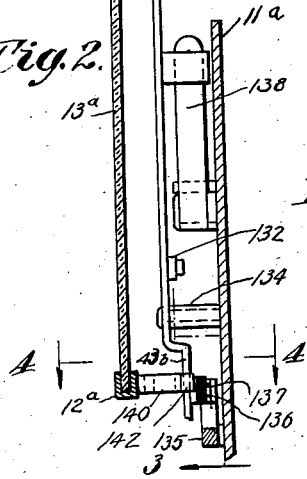
Fig. 3.
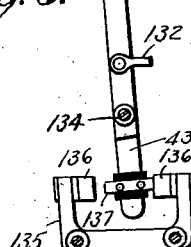
Fig. 4.
Inventors
Daniel L. Chandler
George W. Ewing
Frank H. Walker
By James C. Hamilton
Attorney Oct. 13, 1942.  D. L. CHANDLER ET AL  2,298,527
REVERSING MECHANISM
Original Filed June 22, 1940  3 Sheets-Sheet 2

Inventors
Daniel L. Chandler
George W. Ewing
Frank H. Walker
By James C. Hamilton
Attorney Oct. 13, 1942.  D. L. CHANDLER ET AL  2,298,527
REVERSING MECHANISM
Original Filed June 22, 1940   3 Sheets-Sheet 3
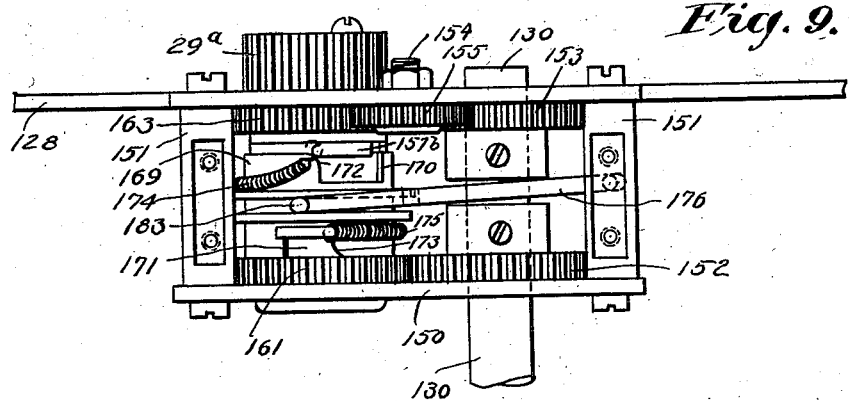
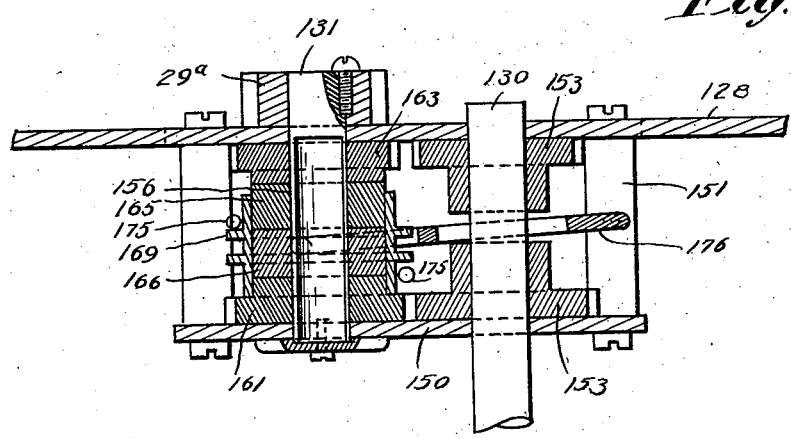
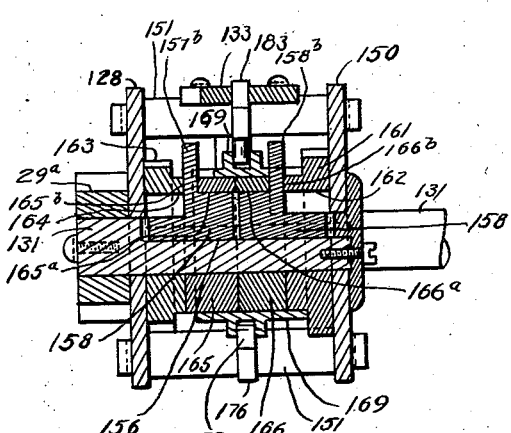
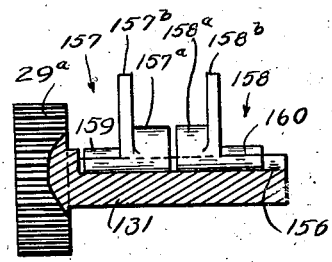
Inventors
Daniel L. Chandler
George W. Ewing
Frank H. Walker
By James C. Hamilton
Attorney Patented Oct. 13, 1942

2,298,527

UNITED STATES PATENT OFFICE 2,298,527

REVERSING MECHANISM

Daniel L. Chandler, Salem, George W. Ewing, Peabody, and Frank H. Walker, Salem, Mass., assignors to Aresee Company Inc., Salem, Mass., a corporation of Massachusetts Original application June 22, 1940, Serial No. 341,838. Divided and this application January 2, 1941, Serial No. 372,935

3 Claims. (Cl. 192—71)

Our present invention relates to automobile window-sash raising and lowering mechanism being a division of application Ser. No. 341,838, filed June 22, 1940.

Heretofore, it has been the practice, in automobile manufacture, to provide hand-operated mechanical means of a more-or-less automatic type in which the automobile window-sash is raised and lowered by means of a crank, lever, or other hand motivated mechanisms. In all such devices, it is necessary for the operator of the window-sash to perform a continuous sustained movement of the hand, arm, and body, in order to continue the movement of the window-sash in either direction.

In the engineering field it is well known and recognized that more and more automobile control of an automatic nature is fast superseding hand-operated mechanisms in which the operator's hand performs a continuous sustained movement during the operation of the various mechanisms.

In the present-day manufacture of automobiles, this full-automatic development of controlling devices is making itself evident in many improvements which contribute to the ease and comfort of the operator.

Our present invention, as set forth in the appended claims, and to which this present application is specifically dedicated relates to a reversing mechanism in which a unidirectional electrical motor operated from any source of electrical power operates certain window-sash raising and lowering mechanism, and for the purpose of utility we are showing and describing the same as applied to automobile doors in combination with certain other mechanisms hereinafter described in connection with our reversing mechanism.

The principal object of our invention is an improved reversing mechanism;

Another object is an improved reversing mechanism which may utilize a continuous unidirectional force and be reversed on the delivery side without stopping the said force, and Other objects and novel features comprising the construction and operation of the same will be apparent as the description of the same progresses.

In the drawings illustrating our invention:

Fig. 1 is an assembled inside elevation of a window-sash mechanism, as mounted in an automobile door, portions of the door having been broken away and other parts removed to better illustrate the arrangement of parts, and especially as to show how our reversing mechanism operates with respect to apparatus of this type;

Fig. 2 is a cross-section, parts of which are broken away for the sake of convenience being taken on the line 2—2 of Fig. 1;

Fig. 3 is a cross-section taken on the line 3—3 of Fig. 2 particularly showing the operation of the operating lever when thrown to the left-hand side position, as indicated in dot-and-dash lines in Fig. 1.

The position shown in this figure illustrates the window-sash moving upwardly and just prior to the time it reaches its uppermost position preceding the reversing or movement of the lever to the right-hand side, or to a neutral position which opens the electrical circuit.

Figure 5:
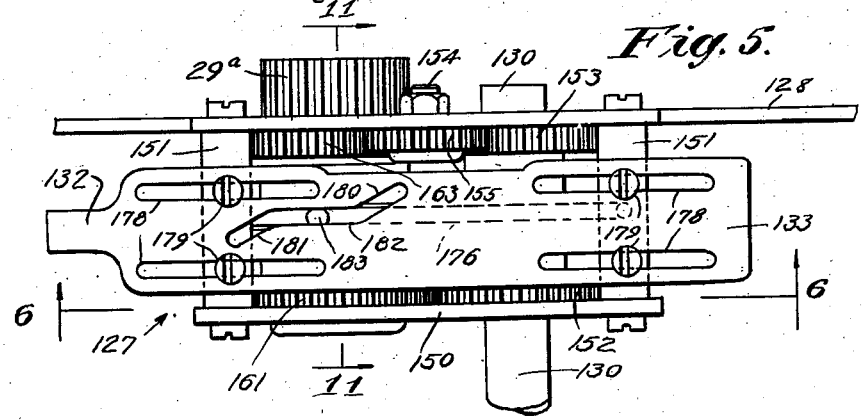
Figure 6:
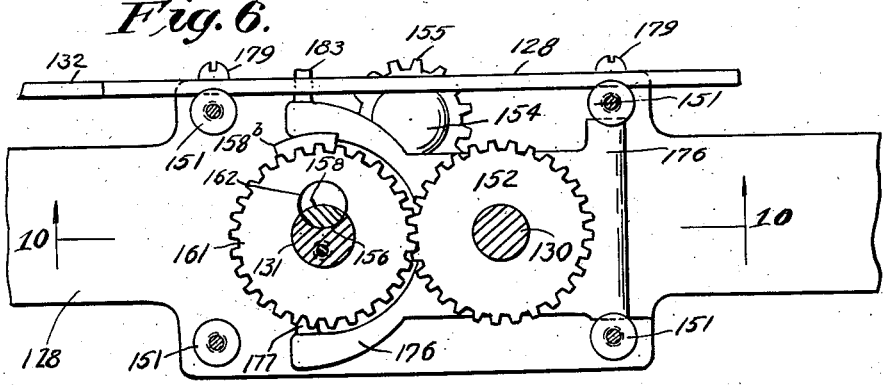
Figures 7, 8:
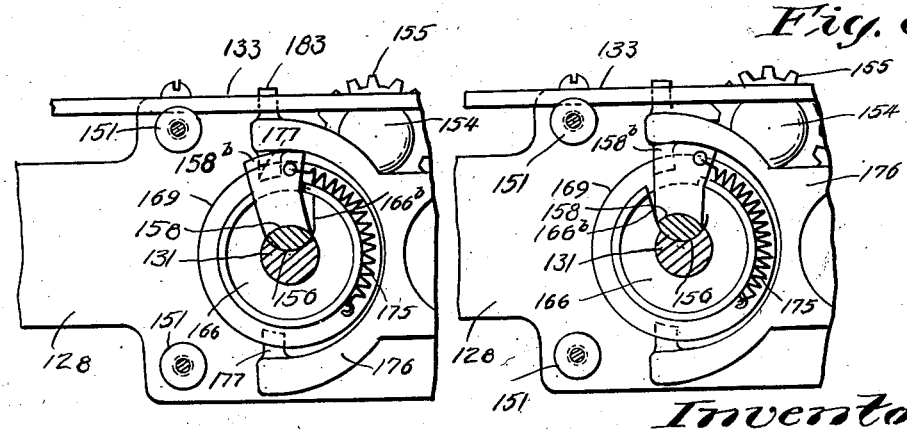

Fig. 4 is a fragmentary cross-section taken on the line 4—4 of Fig. 2. This view shows the relationship of the reversing or operating lever to certain electrical contact members located adjacent the lowermost end of the said reversing lever;

Fig. 5 is a top plan view of the reversing mechanism as indicated in Fig. 1, portions of which are broken off for convenience. In this view the reversing mechanism is fully assembled and the various parts are set in a neutral position;

Fig. 6 is a cross-section taken on the line 6—6 of Fig. 5 showing a side elevation of said reversing mechanism with the near side plate removed, the extreme ends being broken off for convenience;

Fig. 7 is a fragmentary side elevation of Fig. 6, the left-hand portion being cut off and the spur gear removed to better show one of the reversing members;

Fig. 8 is another side elevation similar to Fig. 7 but showing the reversing member in a different position from that shown in Fig. 7;

Fig. 9 is another top plan view similar to Fig. 6, the reversing slide having been removed;

Fig. 10 is a cross-section taken on the line 10—10 of Fig. 6, the front plate shown in Fig. 5 being included;

Fig. 11 is a cross-section taken on the line 11—11 of Fig. 5, and

Fig. 12 is a partial elevation and cross-section of the reversable drive shaft showing reversing members in place on the shaft portion, as removed from the rest of the apparatus.

Referring more in detail to the drawings illustrating our invention, 10a indicates the side frames of an automobile door. In conventional automobile door design the inside panel 11a is provided with the window-sash 12a and elevating and lowering apparatus. The window-sash 12a and glass 13a is slidably mounted in a door frame, as 11a, so that the glass 13a and the channel member 12a in which the glass is mounted can be moved up or down.

A split window sill 14a is provided between the side frames 10a, and so positioned that the glass 13a can be moved up and down between the sill members to any degree of height desired by the operator.

In Fig. 1 it will be noted that we have provided a frame member 15a having bolts 16a, the bolts being shown in cross-section and normally adapted to be fastened in the panel 11a which is cut away. Pivoted in the frame member 15a at 17a and 18a are lever arms 19a and 20a. The lower ends of the arms 19a and 20a are provided with rollers which engage in the channel members 21a and 22a which are fixed to the bottom face of the glass channel member 12a. On the far side of the frame member 15a and attached to the lever arm 19a is segmental gear member 23a. The lever arm 20a is engaged with the lever arm 19a through gears 24a and 25a. A counter balance spring 26a is fixed to the pivot 18a and anchored at 27a to any convenient portion of the frame 15a.

Assuming that the frame 15a is stationarily mounted to the door panel 11a, and the gear segment 23a is rotated, it will be apparent that the arms 19a and 20a will swing in opposite directions about the pivots 17a and 18a and raise or lower the member 12a and attached glass 13a.

In conventional design of automobile doors, a shaft is journalled in the frame 15a and is further provided, on the far side, as viewed in Fig. 1 with a pinion which engages with the teeth in the segment gear 32a, so that the operator can operate the window control mechanism from the inside of the vehicle.

In our present invention application we have eliminated certain parts above referred to in conventional design.

At 125 we have indicated in dot-and-dash lines the rotor of a unidirectional motor which is generally indicated at 126. Attached to the motor frame is a reversing mechanism 127. The extension members 128 are provided with bolts 129 which are secured to the panel 11a. The rotor 125 of the motor 126 is directly connected to the shaft 130 which is reversably connected to a shaft 131 to which is solidly attached the pinion 29a which engages with the segment 23a. The reversing mechanism between the shaft 130 and the pinion 29a will be described in detail further along in the specification.

Connecting with the reversing mechanism 127 is an extension lever 132. The reversing end of the lever 132 is attached to a reversing slide 133, better shown in Fig. 5, the left end being pivoted to the operating lever 43a. The operating lever 43a is pivoted at 134 to the panel 11a is the same manner as the operating lever 43a shown in Fig. 3. Also attached to the panel 11a is a switch member 135 upon which are carried electrical switch contacts 136, the member 135 being connected to the contacts 136 and one side of the motor 126. On the lower end of the lever 43a and insulated therefrom is knife switch blade 137 which is electrically connected to said motor 126. The switch comprising the members 135, 136 and 137 is of the single pole double throw type. In Fig. 1 the operating lever 43a is shown in full lines in its neutral position, the dot-and-dash lines at the top indicates the position of the lever 43a when the window is in motion either up or down. When the lever 43a is pushed to the left-hand side the glass 13a rises and when pushed to the right-hand side the glass 13a moves downwardly. When the lever 43a is released from either the right-hand or the left-hand position the springs 138 which are anchored to the pins 139 in the panel 11a returns the lever 43a to its neutral position. It will be apparent that in either the right or left-hand position, the knife switch member 137 will be engaged with the electrical circuit from the switch member 135 but when in a neutral position the electrical circuit is open.

Attached to the glass channel member 12a is a bracket member 140. On the parallel portions of the bracket 140 are roller members 141 and 142. By an inspection of the lower end of the operating lever 43a, as shown in Fig. 2, it will be noted that the lever is offset, the near portion 43b engaging with the roller 142. At the upper portion of the operating lever 43a is a cam bracket 143.

Assuming that the lever 43a is pushed to the left-hand dot-and-dash position and held there by the operator, the glass channel member 12a will rise until the roll 141 contacts the cam member 143 at which point the lever 43a will be pushed back into neutral position and the electrical circuit opened. Assuming that the glass 13a is up and the lever is pushed to the right-hand dot-and-dash position and held there, then when the roll 142 reaches the offset portion 43b, the lever 43a will be returned to neutral position and again the electrical circuit will be opened. The glass 13a may be stopped at any point by simply releasing the lever 43a, the springs 138 returning the lever 43a to its neutral position.

The reversing of the segment 23a is entirely accomplished within the mechanism 127 without even waiting for the motor rotor 125 to actually stop. The operating lever 43a may be pushed from right to left or left to right instantly even though the motor 126 is running continuously, and also the window glass may be stopped instantly even though the motor 126 continues to operate because when the lever 43a is in a neutral position the pinion 29a is de-energized and is free from driving connection with the shaft 130, as will be described further along in the description of the reversing mechanism 127.

The mechanism 127 is composed of two supporting side portions 128 and 150 being spaced apart by means of end posts or studs 151. The drive shaft 130 which is directly connected to the rotor 125 extends through both sides 128 and 150. On the inside faces of the sides 128 and 150, and set screwed to the drive shaft 130, are gears 152 and 153. Freely journalled on the shaft 154 on the side 128 is a reversing pinion gear 155.

Journalled to the sides 128 and 150 is the pinion shaft 131, the back end of which is fixed to the pinion gear 29a which is directly engaged with the gear teeth on the segment gear member 23a. At a point in the journal of the side frame 128, the shaft 131 is recessed, as shown in Figs. 6, 7, 8, 10 and 12, the recess being indicated at 156 and continuing all the way along the shaft to the front end. The recess 156 is curved on a radius equal to the radius of the shaft 131. Operating in the same recess 156 are rocker key members 157 and 158. The central opposed ends 157a and 158a have diameters equal to the diameter of the shaft 131. The outer ends of the members 157 and 158 are cut down and curved having radial surfaces 159 and 160 corresponding to the radius of the shaft 131. In Figs. 7 and 8, we have removed the gear 161 which is normally engaged with the gear 152. It will be noted that the gear 161 is provided with an offset recess 162, shown in Fig. 6. When the end 160 of the rocker key member 158 is in a neutral position, as shown in Fig. 6, the gear which is driven by the gear 152 is in an idling position and no movement of the shaft will take place as a result of the turning of the gear 161, but when the rocker key 158 is swung to the right, as shown in Fig. 8, the shaft 131 becomes locked with the gear 161 because the end 160 of the rocker key member 158 has then been swung into the recess 162.

On the opposite end of the shaft 131 is another gear 163 which is also provided with a recess 164 similar to the recess 162 in the gear 161. In a similar manner, when the end of the rocker key 157 is in a neutral position the gear 163 idles around the rocker key end and does not drive the shaft 131. Separating the rocker key members 157 and 158 are collars 165 and 166 both of which have recesses 166a and 165a and both of which are identical with the recess 162 in gear 161. The round ends 157a and 158a are journalled in the respective recesses 165a and 166a of the collars 165 and 166 on their upper portions and in the shaft recess 156 on their lower portions. In the outer faces of the collars 165 and 166 are provided recesses 165b and 166b. The recesses are provided with radial side edges. On the upper portion of the rocker key members 157 and 158 are provided levers 157b and 158b respectively which are located in the said recesses 165b and 166b. The slots 165b and 166b are wider than the lever members 157b and 158b so that the levers may be swung to the positions shown in Figs. 7 and 8.

Engaging over the outer peripheries of the collars 165 and 166 and the hub portions of the gears 161 and 163 is the reversing collar 169. This collar 169 can be slid endwise and is provided with recesses 170 and 171. The recesses at their innermost points are the same width as the levers 157b and 158b but adjacent their outer portion there are provided cam surfaces 172 and 173. By an inspection of Fig. 9, it will be noted that these recesses are reversed, the recess cam surface 172 being on the left-hand side and the recess cam surface 173 being on the right-hand side of the collar 169. A spring 174 is anchored to the left-hand side of the collar 169 and the lever 157b. Another spring 175 is anchored to the right-hand side of the collar 169 and the lever 158b. When the reversing collar is slid to the right, as viewed in Fig. 11, the lever, as shown in Fig. 8, is rotated to the position shown in Fig. 7, and the restricted portion of the collar recess 171 holds it in place thereby allowing the gear 161 to idle on the shaft 131. In this position, of the collar 169, the recess 170 has moved away from the lever 157b leaving it tipped to the left by means of the spring 174, as shown in Fig. 9. When the lever 157b is in the position shown in Fig. 9, the end 159 of the rocker key 157 is turned in the shaft recess 156 up into the recessed portion 164 of the gear 163 thereby causing the gear 163 to engage the shaft 131. In a similar manner to that shown in Fig. 8, except that the position of the parts are reversed, as viewed from Fig. 8.

A yoke member 176 is pivoted in the studs 151 to the right of the mechanism 127, the yoke portion having pins 177 adapted to engage in the annular central groove in the reversing collar 169. On the top of the mechanism 127 and slidably engaged in the slots 178 are screws 179 screwed into the studs 151. The slide 133 is provided with a reversing slot having cam recesses 180 and 181 connected together by a neutral passage 182. A pin 183 attached to the yoke member 176 engages in this reversing slot.

On the far inner side adjacent the member 128 are the gears 153, 163 and 155. The gear 155 engages both gears 153 and 163. The gear 153 is fixed to the shaft 130 and moves in one direction only. Gear 155 is a reversing gear between gears 153 and 163.

Assuming that the shaft 130 is moving in a clock-wise direction and the rocker key member 157 is in the position indicated in Fig. 9. In such position the gear 163 is engaged with the shaft 131 and the gear 161 is idling, being in the position shown in Fig. 6 with respect to the rocker key 158. The reversing slide 133 is back to the left with the yoke pin 183 located in the cam portion 181 of the reversing slot. Under such condtions, the pinion 29a also rotates to the right or in a clock-wise direction, similar to shaft 130.

Assuming that the slide 133 is slid all of the way to the left and the pin 183 is now in the cam portion 180 of the reversing slot. In such position, the rocker key 158 is now engaged with the gear 161 and the gear 163 and reverse gear 155 are idling. In this position, the gear 152 drives the gear 161 and shaft 131 is a counter-clock-wise direction.

Assuming that the slide 133 is slid part-way back in either direction and the pin 183 is engaged in the neutral position 182 in the reversing slot of the slide. In such position both the levers 157b and 158b of the rocker keys 157 and 158 respectively are entered in the restricted recesses 170 and 171 of the reversing collar 169 the result of which is that both ends 159 and 160 of rocker keys 157 and 158 are in their neutral position, corresponding to Fig. 6 with respect to the shaft 131, therefore both gears 161 and 163 are idling and the shaft 131 does not turn even though the shaft 130 and gears 152 and 152 continue to rotate.

In operation, if it is desired to raise the glass 13a, shown in Fig. 1, and assuming that the shaft 130 rotates in a clock-wise direction, the operating lever 43a is moved to the right. The slide 133 also moves to the right and the gear 163 engages with the drive shaft 130 thereby causing the segment gear 32a to rotate counter-clock-wise. By releasing the operating lever 43a at any point during the travel of the glass 13a, the spring 138 immediately returns the lever to its neutral position opening the electrical circuit to the motor 126 thereby checking the glass movement. When the lever 43a is in a neutral position and the reversing slide 133 is also in a neutral position, and even though the motor 126 continues to rotate in momentum, the segment gear 23a stops at once. Should the operator wish to instantly raise the glass a small amount, a reversal of the lever starts the segment turning in a reverse direction although the motor rotor 125 is continuing to revolve.

As previously described, the lever 43a is returned to neutral position at either extreme movement of the glass 13a, and in so doing, the electrical circuit to the motor 126 is not only cut off but in addition thereto the reversing mechanism slot returns the yoke 176 freeing both gears 161 and 163 from the shaft 131 which carries the pinion 29a which engages the segment gear 23a.

Having thus described our invention what we claim as new is:

1. In a reversing mechanism having a reversible drive shaft on which are journalled idling gears having radially formed key ways, a clutch assembly comprising in combination, rocker key members having extended lever arms pivoted in recesses located in collars positioned on said shaft, the said rocker key members being rockably journalled on said shaft and engaged with one of said idling gears when rocked to one side from an idling position, a reversing yoke pivoted in said mechanism and engaged with a rotatable reversing collar, a restricted recess located on each end of said collar for the purpose of admitting the said rocker key extended lever arms when said reversing collar is moved longitudinally of the major axis of said drive shaft, one of the exterior corners of said collar recess comprising a cam surface engaged against one side of said rocker key member lever arm, springs anchored to said mechanism and said lever arms for the purpose of maintaining the side of said lever arms against said cam surface thereby rocking said key member into engagement with the said radially formed key ways in said idling gears, the said idling gear then being engaged with said drive shaft.

2. In a reversing mechanism having a reversible drive shaft on which are journalled idling gears having radially formed key ways, a clutch assembly comprising in combination, rocker key members having extended lever arms pivoted in radially disposed recesses formed in the sides of collars positioned on said shaft, the said rocker key members having radially curved back portions engaging with radially curved recesses formed in one side of said drive shaft, radially curved portions located on said key members and engaging with radially formed key ways located in said idling gears when said keys are rocked to one side, a reversing yoke pivoted in said mechanism and engaged with a rotatable reversing collar, a restricted recess located on each end of said collar for the purpose of admitting the said rocker key extended lever arms when said reversing collar is moved longitudinally of the major axis of said drive shaft, one of the exterior corners of said collar recess comprising a cam surface engaged against one side of said rocker key member lever arms, springs anchored to said mechanism and said lever arms for the purpose of maintaining the side of said lever arm against said cam surface thereby rocking said key member into engagement with the said radially formed key ways in said idling gears, the said idling gears then being engaged with said drive shaft.

3. In a reversing mechanism having a reversible drive shaft on which are journalled idling gears having radially formed key ways engaging with rocker key members pivoted against radially curved recesses formed on said drive shaft, lever arms attached to said rocker key members, collars located on said shaft having radially disposed recesses within which said lever arms are located, the rocker movement of said arms being limited by said recesses, springs attached to said arms and anchored to said mechanism for the purpose of maintaining said arms to one side of said collar recesses, a sliding reversing collar slidably engaged over said first collar, said reversing collar having cam recesses on opposite ends, the said cam surfaces engaging with said key lever arms for the purpose of engaging said idling gears with said shaft when said key arms are moved to one side of the recesses in said first collars.

DANIEL L. CHANDLER.
GEORGE W. EWING.
FRANK H. WALKER.